US012698449B2

(12) United States Patent
Girgis et al.

(10) Patent No.: US 12,698,449 B2
(45) Date of Patent: Aug. 4, 2026

(54) SELECTIVE PRODUCTION OF N-PARAFFIN HYDROCRACKING PRODUCTS FROM HEAVIER N-PARAFFINS

(71) Applicant: CHEVRON U.S.A. INC., San Ramon, CA (US)

(72) Inventors: Michael J. Girgis, Richmond, CA (US); Stacey I. Zones, San Francisco, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 185 days.

(21) Appl. No.: 17/917,309

(22) PCT Filed: Apr. 6, 2021

(86) PCT No.: PCT/IB2021/052829
§ 371 (c)(1),
(2) Date: Oct. 6, 2022

(87) PCT Pub. No.: WO2021/205328
PCT Pub. Date: Oct. 14, 2021

(65) Prior Publication Data
US 2023/0141033 A1      May 11, 2023

Related U.S. Application Data

(60) Provisional application No. 63/005,938, filed on Apr. 6, 2020.

(51) Int. Cl.
| | |
|---|---|
| *C10G 47/18* | (2006.01) |
| *B01J 29/12* | (2006.01) |
| *B01J 29/74* | (2006.01) |

(52) U.S. Cl.
CPC ............ *C10G 47/18* (2013.01); *B01J 29/126* (2013.01); *B01J 29/7469* (2013.01); *C10G 2300/1081* (2013.01); *C10G 2300/4006* (2013.01); *C10G 2300/4012* (2013.01); *C10G 2300/4018* (2013.01); *C10G 2300/4025* (2013.01); *C10G 2300/70* (2013.01)

(58) Field of Classification Search
CPC ............ C10G 47/18; C10G 2300/1081; C10G 2300/4006; C10G 2300/4012; C10G 2300/4018; C10G 2300/4025; C10G 2300/70; B01J 29/126; B01J 29/7469; B01J 35/394; Y02P 20/52
See application file for complete search history.

(56) References Cited

U.S. PATENT DOCUMENTS

| | | | | | | |
|---|---|---|---|---|---|---|
| 4,501,926 | A | * | 2/1985 | LaPierre | ............... | C10G 45/64 |
| | | | | | | 585/739 |
| 5,171,422 | A | * | 12/1992 | Kirker | ................... | C10G 47/20 |
| | | | | | | 208/111.1 |
| 5,284,985 | A | | 2/1994 | Girgis | | |
| 5,364,997 | A | | 11/1994 | Girgis | | |
| 5,397,457 | A | | 3/1995 | Harandi | | |
| 2001/0001449 | A1 | * | 5/2001 | Kiliany | .................. | C10G 47/20 |
| | | | | | | 208/111.15 |
| 2004/0004020 | A1 | * | 1/2004 | Grove | .................... | C10G 65/12 |
| | | | | | | 208/108 |
| 2007/0032692 | A1 | * | 2/2007 | O'Rear | .................... | B01J 29/86 |
| | | | | | | 585/752 |
| 2009/0048477 | A1 | * | 2/2009 | Seki | ........................ | C10G 47/20 |
| | | | | | | 502/66 |
| 2014/0163249 | A1 | | 6/2014 | Chen et al. | | |

FOREIGN PATENT DOCUMENTS

| | | |
|---|---|---|
| CN | 102639472 A | 8/2012 |
| FI | 870154 A7 | 4/1988 |
| JP | S61157352 A | 7/1986 |
| JP | 2002534558 A | 10/2002 |
| JP | 2004504133 A | 2/2004 |
| JP | 2007204506 A | 8/2007 |
| WO | 2010022254 | 2/2010 |
| WO | 2011056469 | 5/2011 |
| WO | 2020016845 | 1/2020 |
| WO | 2020219313 | 10/2020 |

OTHER PUBLICATIONS

International Search Report issued on Jun. 25, 2021, during the prosecution of International Application No. PCT/IB2021/052829.
Written Opinion of the International Searching Authority issued on Jun. 25, 2021, during the prosecution of International Application No. PCT/IB2021/052829.
Girgis et al., "Impact of catalyst metal-acid balance in n-hexadecane hydroisomerization and hydrocracking." Industrial & engineering chemistry research 35.2 (1996): 386-396.
Girgis et al., "Utilization of n-hexadecane reaction pathways to probe performance of dual-function catalysts." Abstract of paper presented at Advances in Hydrocracking and Hydrotreating Symposium. 2020 ACS Fall National Meeting, San Francisco, CA. 2020.
Group notation revised in periodic table, Chemical and Engineering News, vol. 63, No. 5, 1985, p. 26-27.
IUPAC Periodic Table of Elements, Jun. 2007, URL: https://iupac.org/wp-content/uploads/2018/02/IUPAC_Periodic_Table-22Jun07b.pdf, 01 page.
Steijns et al. "Hydroisomerization and hydrocracking. 2. Product distributions from n-decane and n-dodecane." Industrial & Engineering Chemistry Product Research and Development 20.4 (1981): 654-660.

* cited by examiner

*Primary Examiner* — Michelle Stein
(74) *Attorney, Agent, or Firm* — Mark Warzel

(57)      ABSTRACT

A process for selectively making hydrocracked n-paraffins from hydrocarbon compositions comprising heavy n-paraffins is disclosed. The process generally comprises the use of a hydrocracking catalyst comprising an unsulfided low acidity noble metal containing zeolite. The invention is useful for making lighter n-paraffin products for various applications, generally including upgrading hydrocarbon feedstocks to produce fuels, solvents, lubricants, chemicals and other hydrocarbonaceous compositions, and more particularly, as feedstocks for ethylene and linear alkyl benzene production and as jet and diesel fuel blend components.

8 Claims, 13 Drawing Sheets

SELECTIVE PRODUCTION OF N-PARAFFIN HYDROCRACKING PRODUCTS FROM HEAVIER N-PARAFFINS

CROSS REFERENCE TO RELATED APPLICATIONS

This application is the national stage application of International Appl. No. PCT/IB2021/052829 (doc. no. T-11195), filed on Apr. 6, 2021, and is related to, and claims priority benefit from, U.S. Provisional Application Ser. No. 63/005,938, filed on Apr. 6, 2020, entitled "Selective Production of N-Paraffin Hydrocracking Products From Heavier N-Paraffins", the disclosures of which are herein incorporated by reference in their entirety.

FIELD OF THE INVENTION

The invention concerns a process for selectively making hydrocracked n-paraffins from hydrocarbon compositions comprising heavy n-paraffins, in particular through the use of a hydrocracking catalyst comprising an unsulfided low acidity noble-metal containing zeolite. The invention is useful for making lighter n-paraffin products for various applications, generally including upgrading hydrocarbon feedstocks to produce fuels, solvents, lubricants, chemicals and other hydrocarbonaceous compositions, and more particularly, as feedstocks for ethylene and linear alkyl benzene production and as jet and diesel fuel blend components.

BACKGROUND OF THE INVENTION

Light n-paraffin products have various application as solvents, feedstocks for ethylene production, jet and diesel fuel blend components, and feedstocks for linear alkyl benzene production. Hydrocracking of n-paraffins typically produces branched paraffins in yields that are comparable to those of n-paraffins. Recovery of n-paraffin cracking products for such applications typically requires a separation step which may be costly. In addition, yields of n-paraffins would also be lower due to branched paraffin formation.

Previous work has shown benefits associated with the use of low acidity molecular sieves to convert multi-branched heavy hydrocarbons to high octane gasoline (U.S. Pat. No. 5,364,997) and for the selective hydrocracking of distillates to produce naphtha range high octane isoparaffins (U.S. Pat. No. 5,284,985). Platinum-loaded borosilicate or aluminoborosilicate zeolites have also been reported to provide high selectivities for n-paraffins (U.S. Pat. Appl. US 2007/0032692 A1).

Despite the progress made in preparing hydroprocessing catalysts that are selective to produce certain paraffins, a continuing need exists for catalysts useful to make n-paraffin compositions and for improved and simplified processes to make such compositions.

SUMMARY OF THE INVENTION

This invention generally provides a new approach for making n-paraffin compositions with desirable characteristics and n-paraffin content by hydrocracking heavier n-paraffin feeds. Hydrocracking of heavier n-paraffin feeds is carried out using a hydrocracking catalyst that provides increased selectivity for lower n-paraffin products. The process broadly provides for selectively producing hydrocracked n-paraffins from heavy n-paraffins comprising contacting a hydrocarbon feed comprising heavy n-paraffins with a hydrocracking catalyst comprising an unsulfided low acidity noble-metal containing zeolite under hydrocracking conditions to produce a hydrocarbon product comprising hydrocracked n-paraffins. In one aspect, the hydrocracking catalyst may be an aluminosilicate having a silica-to-alumina ratio of a sufficient value or range to selectively produce n-paraffin cracking products, preferably n-paraffin products over isoparaffin products.

One of the goals of the invention is to provide improvements in the yield of lower n-paraffin product compositions that may generally also provide lower capital and operating costs for other hydroprocessing applications. In certain applications, it is also desirable to provide a process that utilizes milder process conditions and to minimize undesirable side reactions.

BRIEF DESCRIPTION OF THE DRAWINGS

The scope of the invention is not limited by any representative figures accompanying this disclosure and is to be understood to be defined by the claims of the application.

DETAILED DESCRIPTION

Figure 1A:
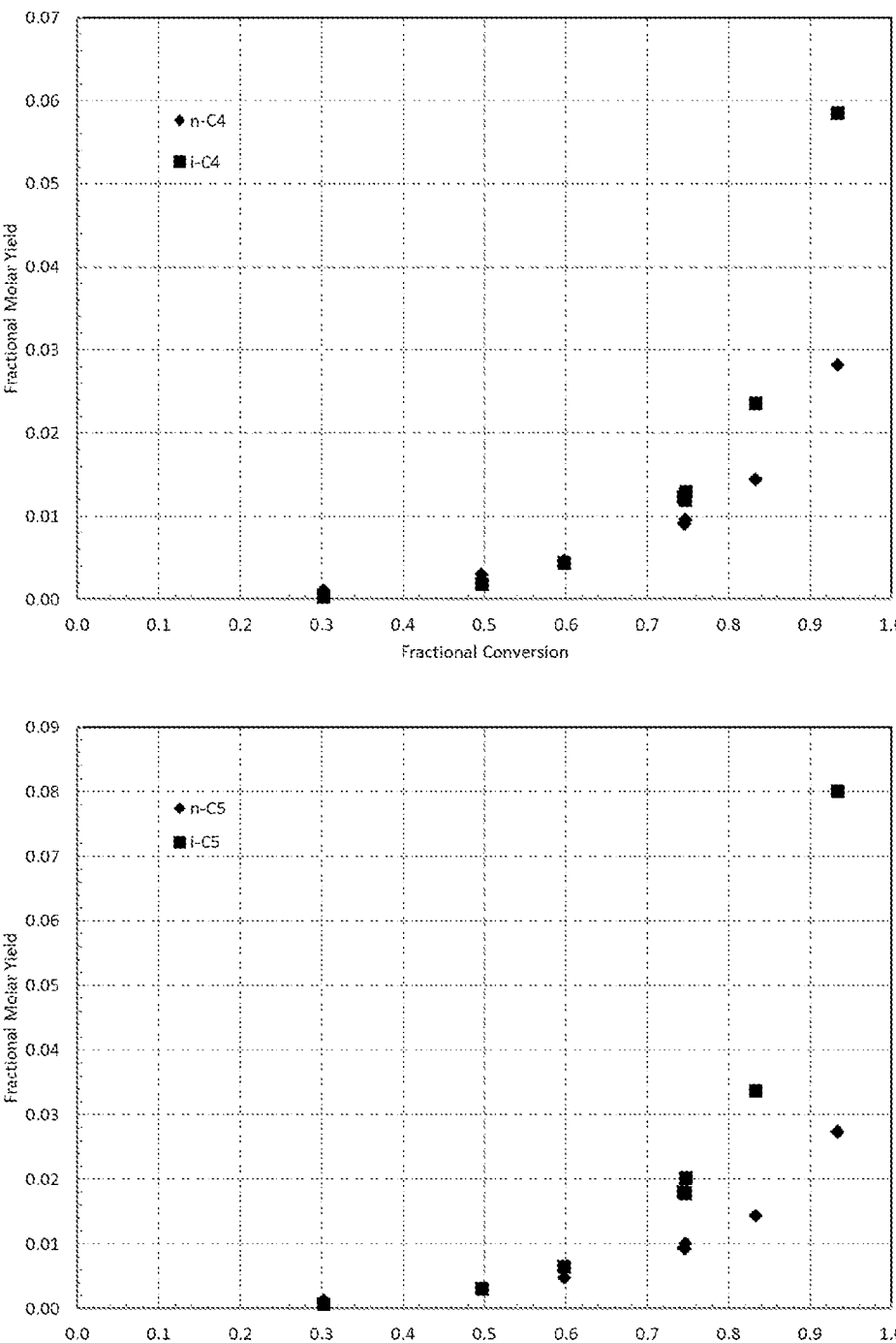
FIGS. 1a, 1b, 1c, 1d, and 1e show selectivity profiles of paraffin cracking products using a Pt/USY, SAR=60 hydrocracking catalyst, as described in the examples.
Figure 1B:
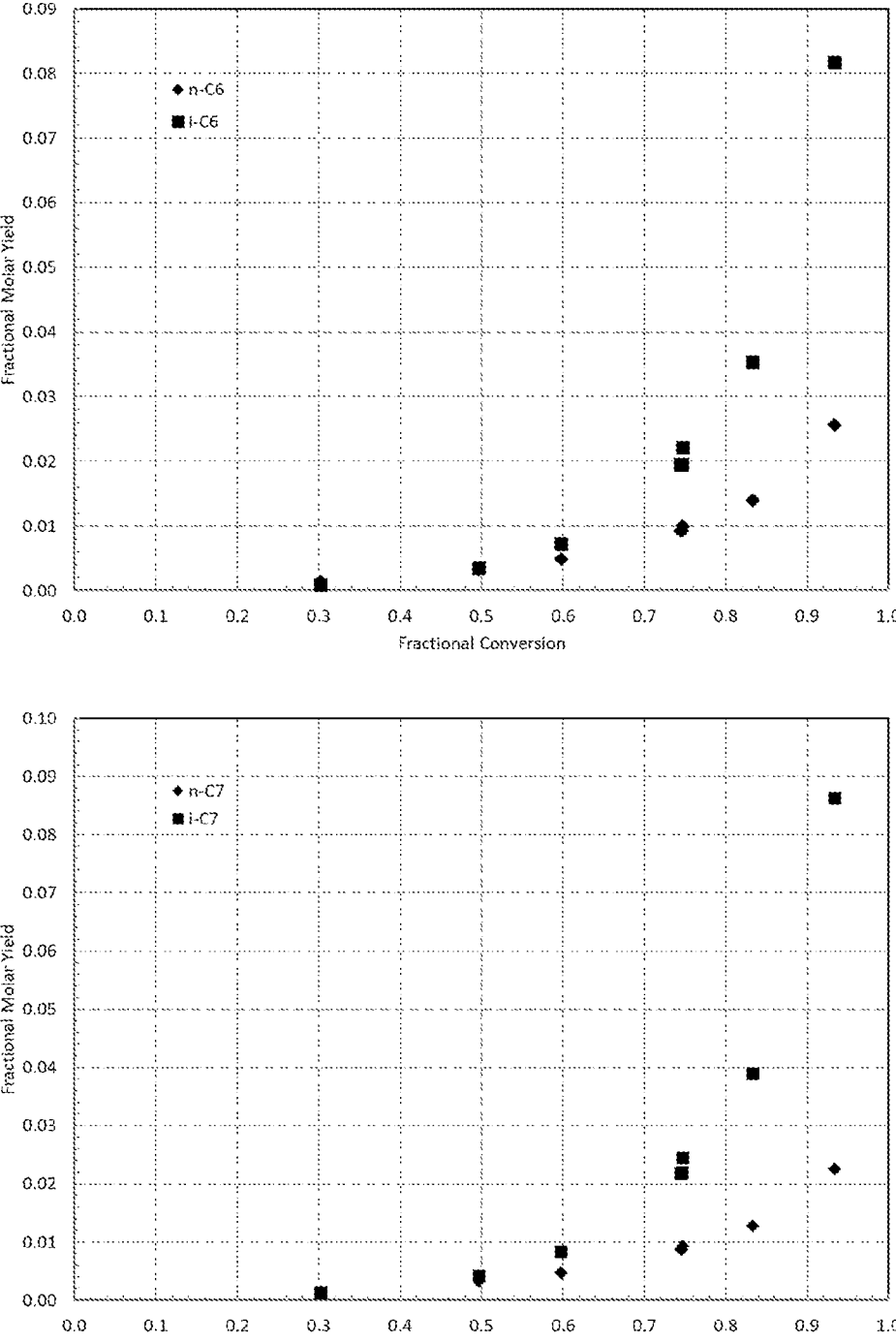
Figure 1C:
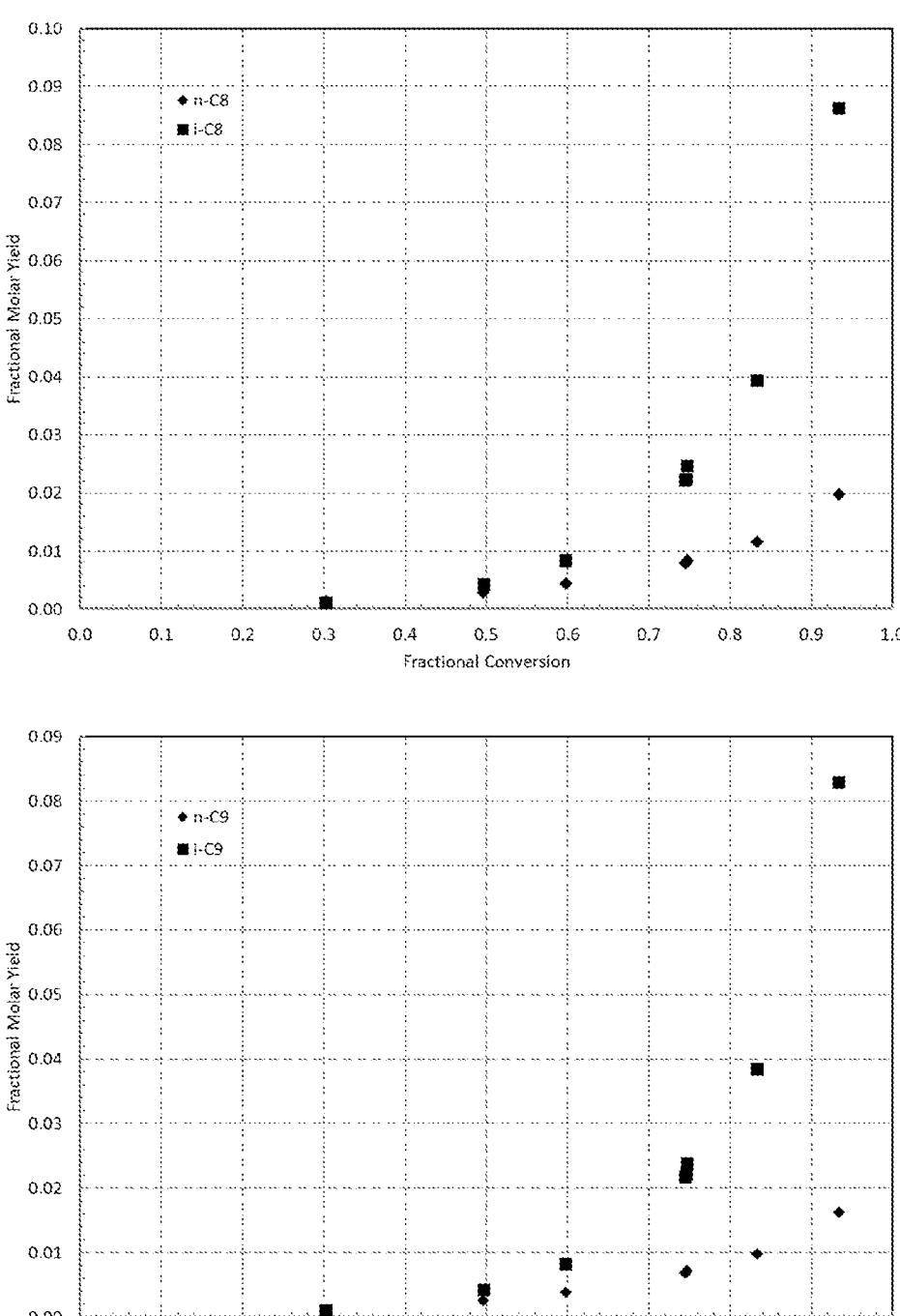
Figure 1D:
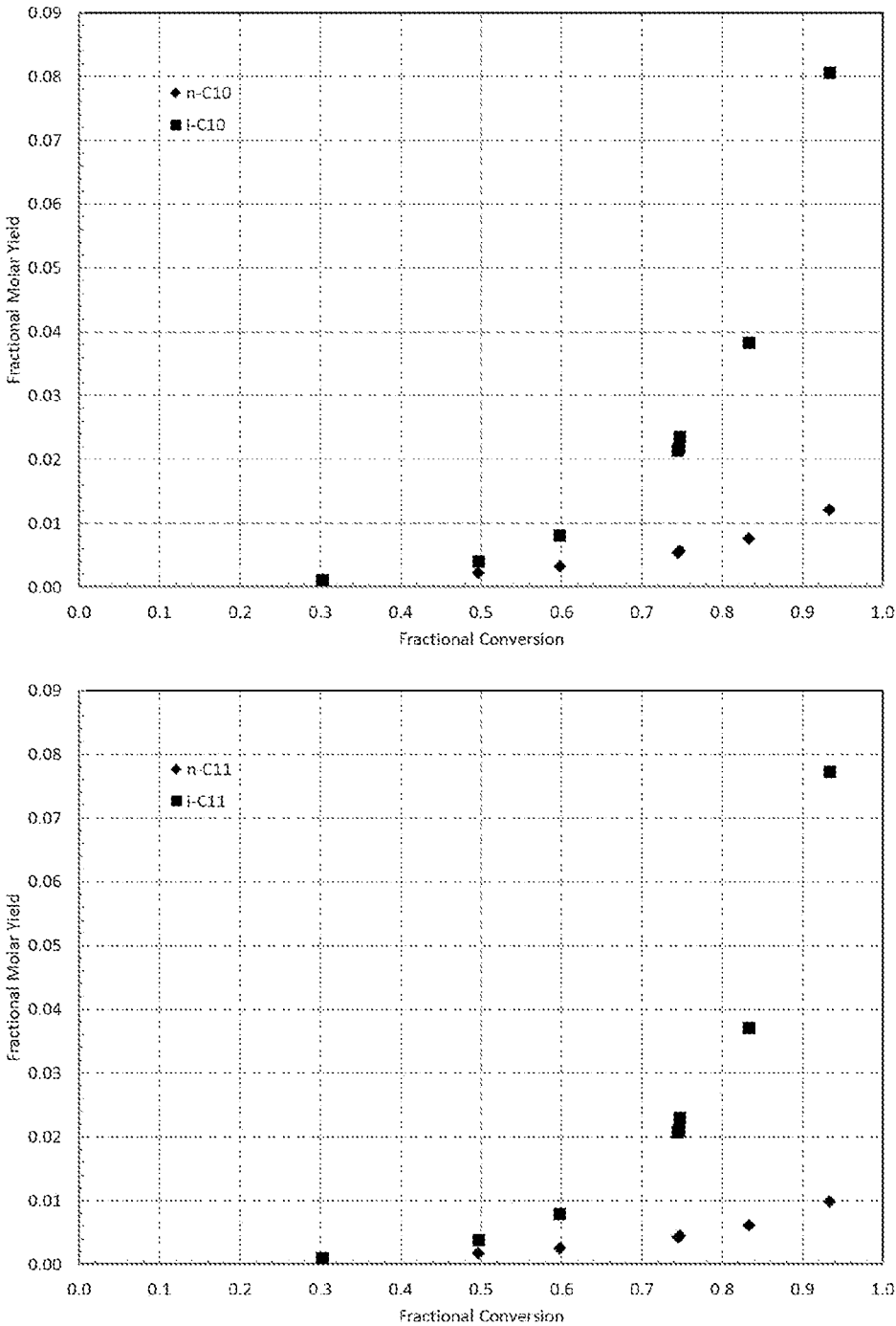
Figure 1E:
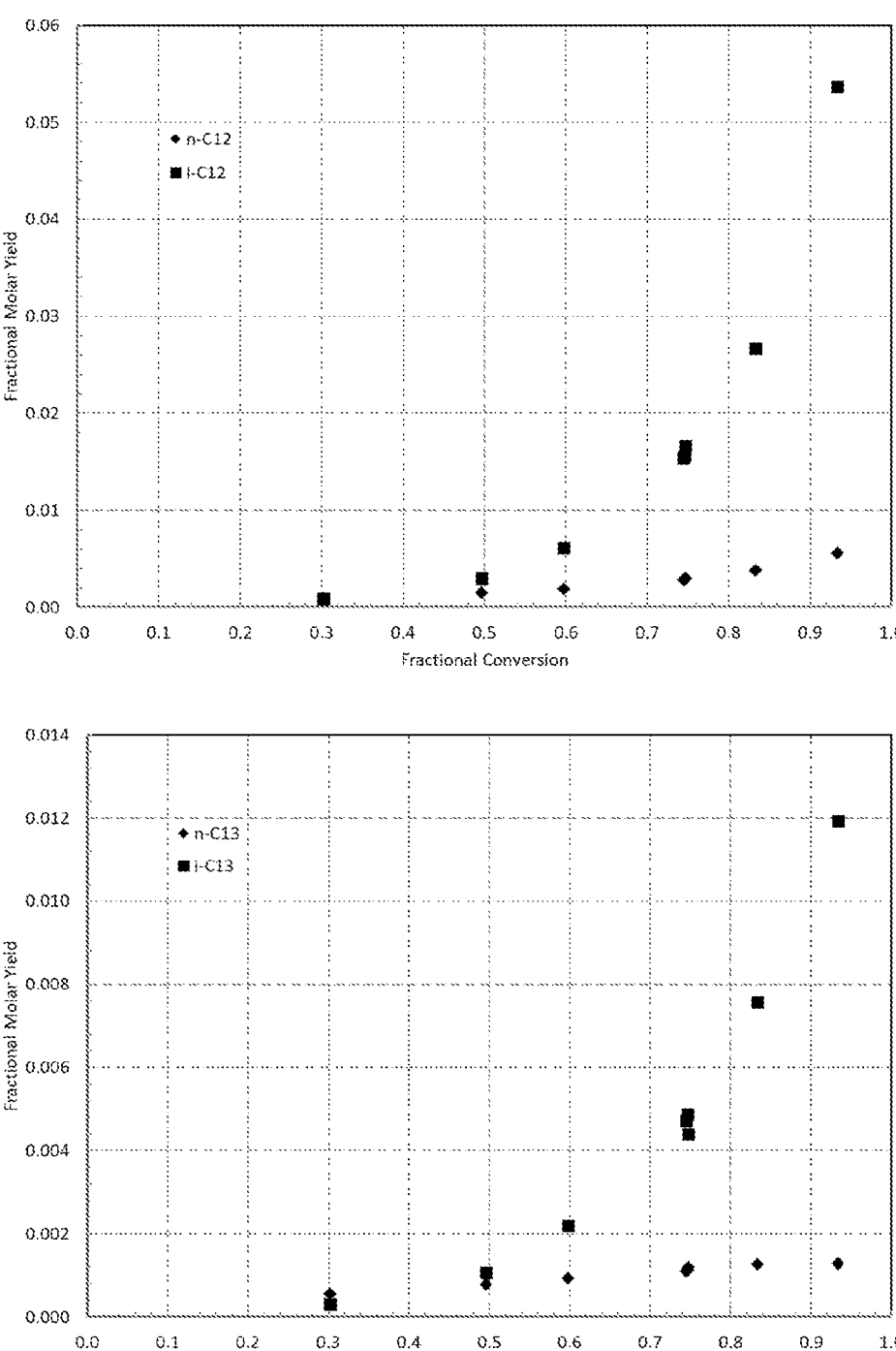
Figure 2A:
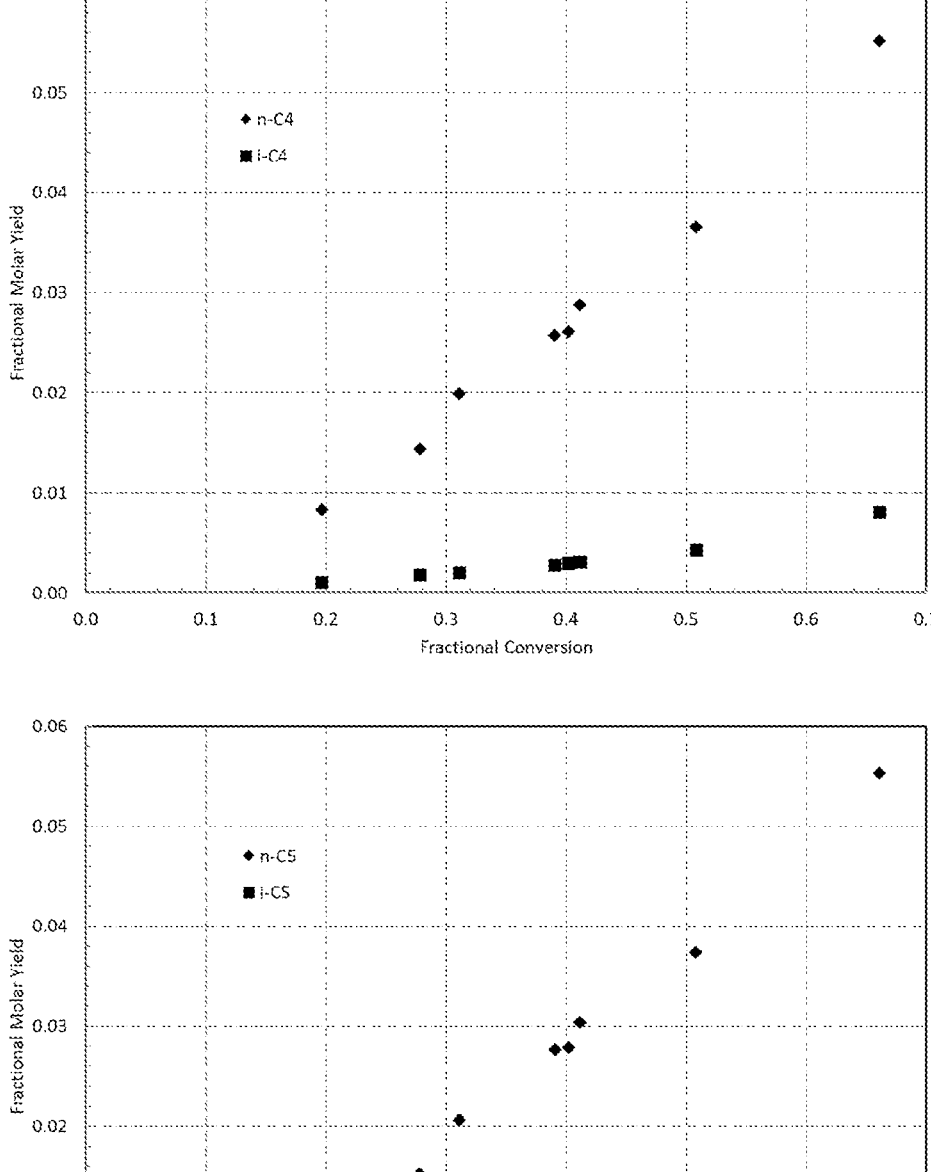
FIGS. 2a, 2b, 2c, 2d, and 2e show selectivity profiles of paraffin cracking products using a Pt/USY, SAR=108 hydrocracking catalyst, as described in the examples.
Figure 2B:
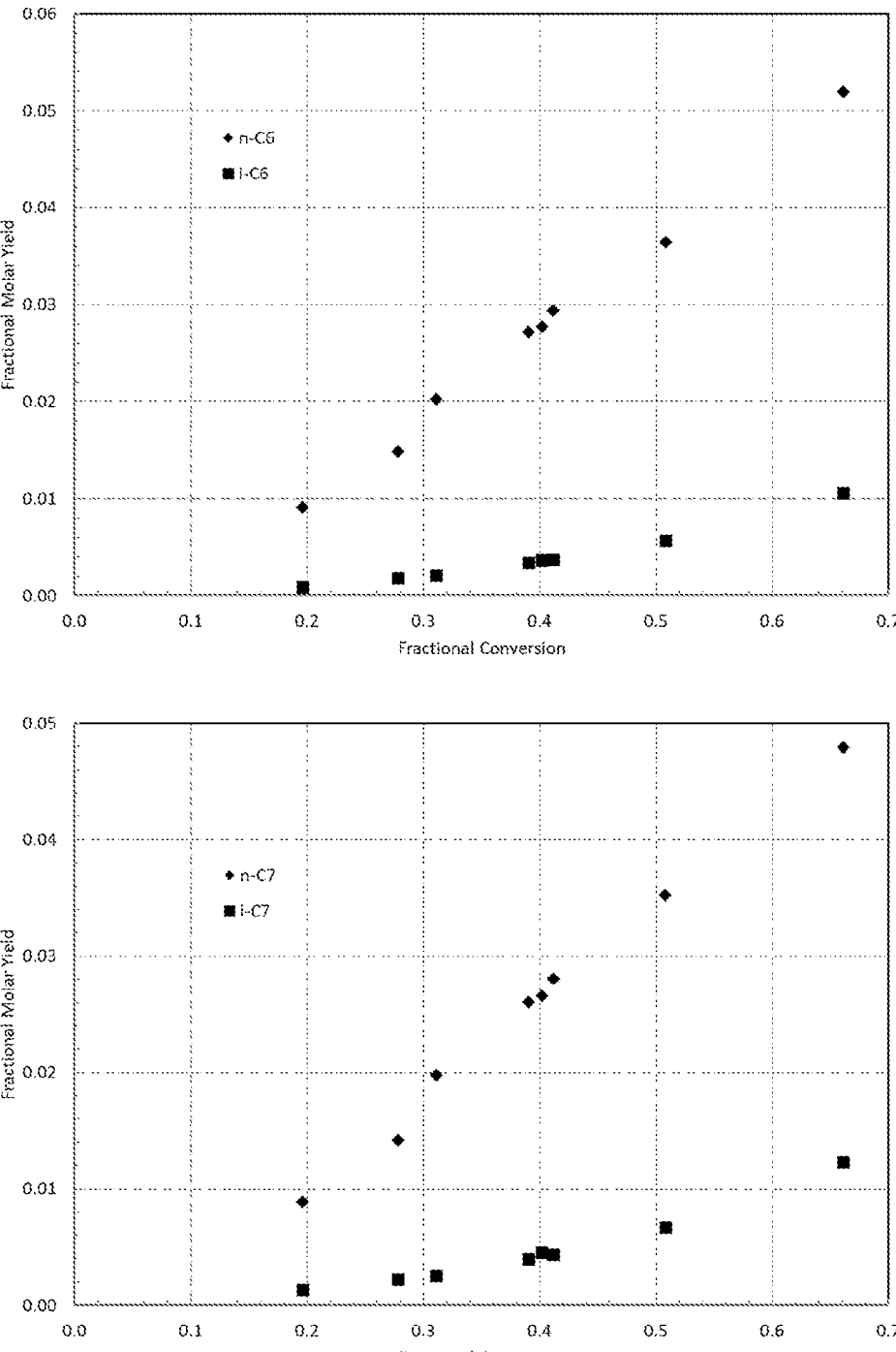
Figure 2C:
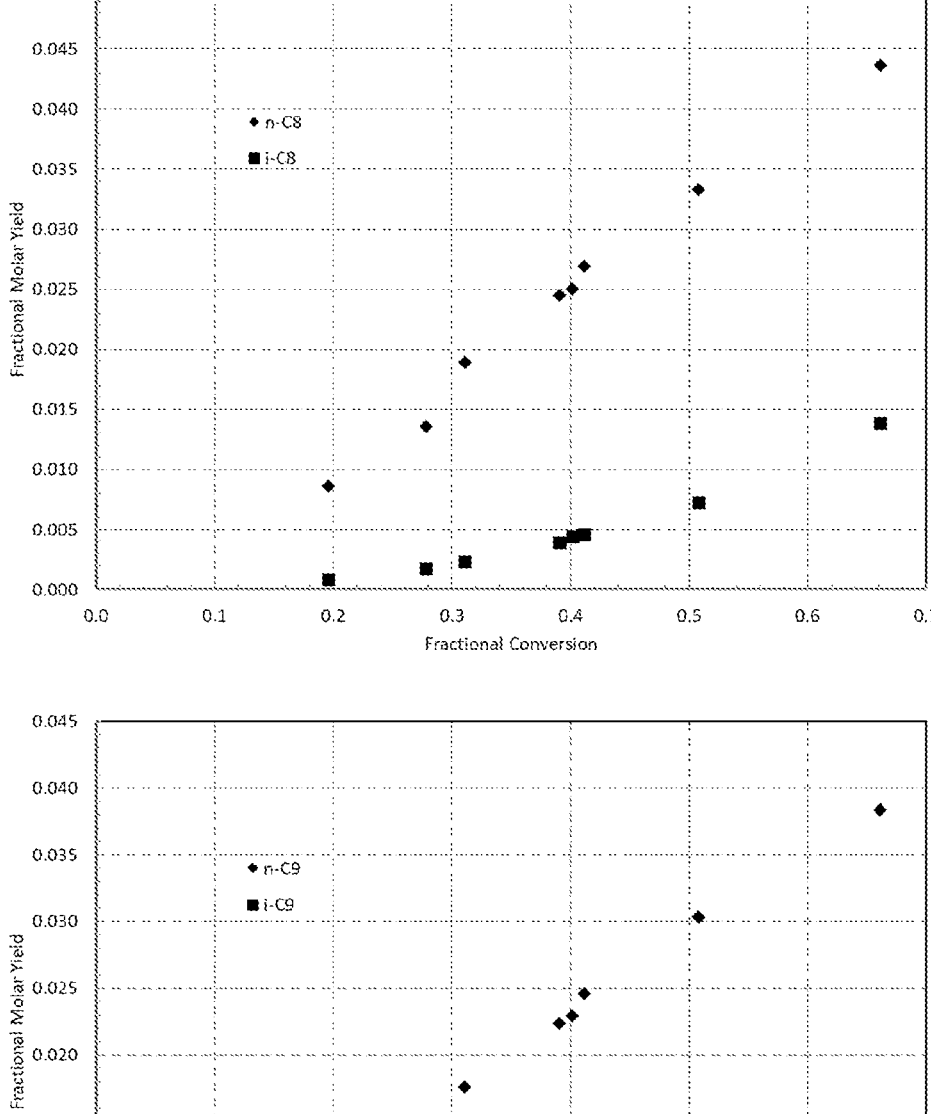
Figure 2D:
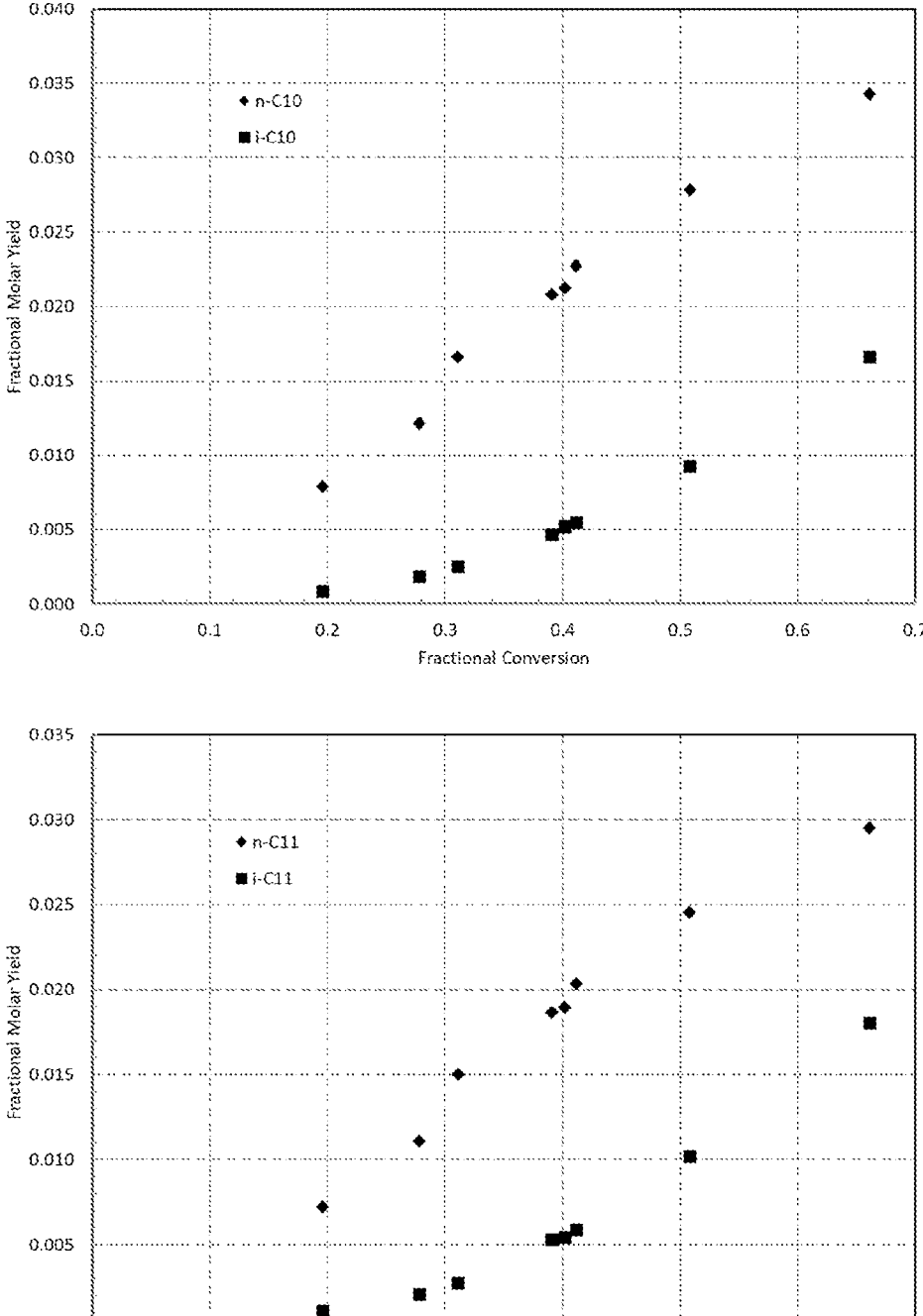
Figure 2E:
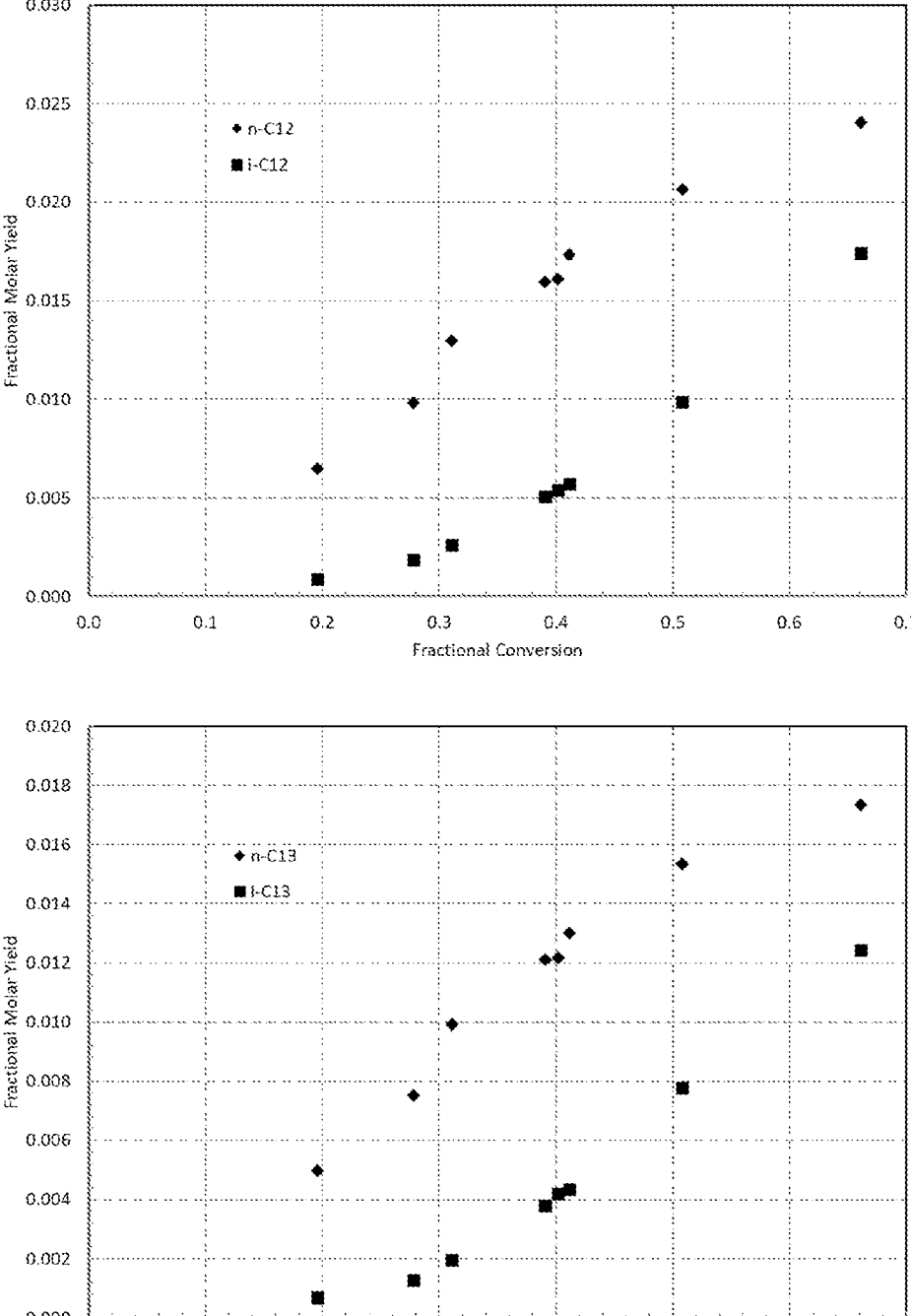

Although illustrative embodiments of one or more aspects are provided herein, the disclosed processes, and compositions formed therefrom, may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"Periodic Table" refers to the version of IUPAC Periodic Table of the Elements dated Jun. 22, 2007, and the numbering scheme for the Periodic Table Groups is as described in Chemical and Engineering News, 63(5), 27 (1985).

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

"Hydroprocessing" or "hydroconversion" refers to a process in which a carbonaceous feedstock is brought into contact with hydrogen and a catalyst, at a higher temperature and pressure, for the purpose of removing undesirable impurities and/or converting the feedstock to a desired product. Such processes include, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved physical properties such as improved viscosities, viscosity indices, saturates content, low temperature properties, volatilities and depolarization.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins into non-cyclic paraffins.

The terms "binder" or "support", particularly as used in the term "catalyst support", refers to conventional materials that are typically a solid with a high surface area, to which catalyst materials are affixed. Support materials may be inert or participate in the catalytic reactions, and may be porous or non-porous. Typical catalyst supports include various kinds of carbon, alumina, silica, and silica-alumina, e.g., amorphous silica aluminates, zeolites, alumina-boria, silica-alumina-magnesia, silica-alumina-titania and materials obtained by adding other zeolites and other complex oxides thereto.

"Molecular sieve" refers to a material having uniform pores of molecular dimensions within a framework structure, such that only certain molecules, depending on the type of molecular sieve, have access to the pore structure of the molecular sieve, while other molecules are excluded, e.g., due to molecular size and/or reactivity. Zeolites, crystalline aluminophosphates and crystalline silicoaluminophosphates are representative examples of molecular sieves.

"Middle distillates" include jet fuel, diesel fuel, and kerosene, typically with cut points as shown below:

| Products | Typical Cut Points, ° F. (° C.) for North American Market |
|---|---|
| Light Naphtha | C5-180 (C5-82) |
| Heavy Naphtha | 180-300 (82-149) |
| Jet | 300-380 (149--193) |
| Kerosene | 380-530 (193-277) |
| Diesel | 530-700 (277-371) |

$SiO_2/Al_2O_3$ ratio (SAR) is determined by inductively coupled plasma (ICP) elemental analysis. A SAR of infinity means there is no aluminum in the zeolite, i.e., the mole ratio of silica to alumina is infinity.

In this disclosure, while compositions and methods or processes are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "an alkali metal" is meant to encompass one, or mixtures or combinations of more than one, transition metal or alkali metal, unless otherwise specified.

All numerical values within the detailed description and the claims herein are modified by "about" or "approximately" the indicated value, and take into account experimental error and variations that would be expected by a person having ordinary skill in the art.

The inventive process selectively produces hydrocracked n-paraffins from heavy n-paraffins by contacting a hydrocarbon feed comprising heavy n-paraffins with a hydrocracking catalyst that is selective for producing such n-paraffins. In general, the hydrocracking catalyst comprises an unsulfided low acidity noble-metal containing zeolite, while the under hydrocracking conditions are suitable to produce a hydrocarbon product comprising hydrocracked n-paraffins.

The zeolite may typically be an aluminosilicate with low acidity, including low alumina content and/or a high silica-to-alumina ratio. While not specifically limited to a particular lower value or range, the zeolite silica-to-alumina ratio is of a sufficient value or range to selectively produce n-paraffin cracking products, preferably n-paraffin products over isoparaffin products. More specific useful ranges include low acidity zeolites having silica-to-alumina ratios of at least about 70, or 80, or 90, or 100, or 110, or 120. The zeolite may an aluminosilicate that does not contain boron or is not a borosilicate or aluminoborosilicate, or is other than a borosilicate or aluminoborosilicate. Specific examples of suitable zeolites may include hydrocracking catalysts selected from USY, Beta, ZSM-4, ZSM-12, ZSM-18, ZSM-20, Y, L or a combination thereof. Useful zeolites noted herein are well-described in the patent literature, e.g., U.S. Pat. Nos. 5,284,985 and 5,364,997.

The process of may be used to produce hydrocracked n-paraffin compositions from heavier n-paraffins, e.g., where the heavy n-paraffins comprise $C_{12+}$ n-paraffins, or are predominantly $C_{12+}$ n-paraffins, or wherein the $C_{12+}$ content is greater than about 50 wt %, or 60, or 70, or 80, or 90, or 95, or 98, or is about 100%. Suitable feeds comprising heavier n-paraffins are not necessarily limited, and may include waxy feedstocks, such as high molecular weight Fischer-Tropsch waxes, hydrocracker recycle streams, gas oils, and paraffinic resids. Feeds with up to about 30 wt. % and higher of normal and slightly branched paraffins having 2 or less alkyl substituents may also be used.

The noble metal may generally include any noble metal such as platinum and palladium, along with other Group VIIIA metals such as iridium and rhodium. Preferably, the noble metal comprises platinum, or is platinum.

The noble metal may be incorporated into the catalyst by any suitable method such as impregnation or exchange onto the zeolite. The noble metal may be incorporated in the form of a cationic, anionic or neutral complex such as $Pt(NH_3)_4^{2+}$ and cationic complexes of this type will be found convenient for exchanging metals onto the zeolite. The amount of noble metal is suitably from about 0.01 to about 10 percent by weight, normally from about 0.1 to about 2.0 percent by weight. In a preferred method of synthesizing Pt/boron-containing zeolite Beta the platinum compound is tetraamineplatinum hydroxide. The noble metal is preferably introduced into the catalyst composition with a pH neutral solution.

A high level of noble metal dispersion is generally preferred. For example, platinum dispersion is measured by the hydrogen chemisorption technique and is expressed in terms of H/Pt ratio. The higher the H/Pt ratio, the higher the platinum dispersion. Preferably the resulting zeolite should have an H/Pt ratio greater than about 0.8.

Binder materials may also be used with the zeolite, such as silica, silica alumina, silica-boria, silica-magnesia, silicazirconia, silica-thoria, silica-berylia, silica-titania as well as ternary compositions such as silica-alumina-boria, silica alumina-thoria, silica-alumina-zirconia, silica-alumina magnesia or silica-magnesia-zirconia. When used, the ratio of binder to zeolite will typically vary from about 9:1 to about 1:9, more commonly from about 3:1 to about 1:3 (by weight).

The process is conducted under suitable hydrocracking conditions for the particular catalyst used; such conditions typically comprise a temperature of about 270° C. to about 330° C., a pressure in the range of about 200 psig to about 2000 psig and a space velocity in the range of about 0.4 to about 2.0 LHSV hr$^{-1}$.

The process is typically conducted with a low sulfur feed having less than about 500 ppm sulfur and less than about 50 ppm nitrogen. It is preferable that the feed to the process have less than about 50 ppm sulfur. Feeds having less than about 500 ppm sulfur without preliminary hydrotreatment prior to contacting with the unsulfided catalyst composition of the present invention are preferred.

A hydrotreating step using a conventional hydrotreating catalyst may also be carried out to remove nitrogen and sulfur and to saturate aromatics to naphthenes without substantial boiling range conversion. Suitable hydrotreating catalysts generally comprise a metal hydrogenation component, usually a Group VIA or VIIIA metal. Hydrotreating will usually improve catalyst performance and permit lower temperatures, higher space velocities, lower pressures or combinations of these conditions to be employed.

The process of the invention provides a number of advantages, as supported by the examples that follow, including improved fractional yield of hydrocracked n-paraffin product relative to isoparaffins produced, as compared with hydrocracking catalysts that do not utilize a low acidity zeolite. For example, when hydrocracking performance for n-paraffin production is compared with a similar zeolite that differs from the low acidity zeolite only in the silica-to-alumina ratio (SAR), significant improvements in product n-paraffin content may be realized. While not necessarily limited thereto, such fractional yield improvements may be, e.g., at least about 10 mol % greater than a corresponding fractional yield obtained using a hydrocracking catalyst that differs only in having a zeolite silica-to-alumina ratio that is no greater than about 60. In some embodiments, such fractional yield improvements may be even greater, e.g., at least about 20, or 30, or 40, or 50, or 60, or 70, or 80, or 90, or 100 mol % greater than a corresponding fractional yield obtained using a hydrocracking catalyst that differs only in having a zeolite silica-to-alumina ratio that is no greater than about 60.

EXAMPLES

Example 1: Preparation of Pt/USY Zeolite with a Silica-to-Alumina Ratio (SAR)=60

The USY zeolite used, CBV-760, was obtained from Zeolyst. The platinum addition was carried out as follows:

1 gram of CBV-760 (FAU zeolite from Zeolyst) was added to a vial along with 5 g of 0.148M NH$_4$OH solution and 6 mL of DI water. A platinum-containing solution was prepared by dissolving 350 mg of Pt(NH$_3$)$_4$(NO$_3$)$_2$ in 5 g of 0.148M NH$_4$OH solution and 32 ml of H$_2$O. One mL of the latter platinum solution was added to the vial containing CVB-760, 0.148 M NH$_4$OH solution, and water.

The solution was left to stand for 2-3 d at room temperature and subsequently filtered. The platinum-containing zeolite powder was dried at 90° C. in an oven for 2-4 hr and then placed as a fine powder in a thin glass dish and calcined to 300° C. in air flowing at 20-40 ft$^3$/min. A stepped heating program was used: a) heat at 1° C./min to 120° C., b) hold for 2 hr, c) heat at 1° C./min to 300° C., d) hold for 3 hr, e) turn off heat and allow cooling to room temperature.

The catalyst was pressed into a pellet, which was crushed to give solids with a 20-40-mesh size upon sieving.

The properties of the lower SAR Pt/USY catalyst are provided below:

Pt content, wt %: 0.43
Pt dispersion, strong, %: 52.20
Pt dispersion, total, %: 128.20
Al content, wt %: 1.22
Si content, wt %: 44.5
SiO$_2$/Al$_2$O$_3$ molar ratio (SAR): 58.5

Example 2: Selectivity Profiles Using Pt/USY (SAR=60), Preparation Described in Example 1

0.7 g of the catalyst whose preparation is described in Example 1 was diluted with inert alundum and charged to a reactor comprised of a 0.25"-OD tube of 0.035" wall thickness placed in a furnace.

The catalyst was dried by flowing 50 cm$^3$/min of N$_2$ over the catalyst bed at 250° F. for at least 2 hr. The catalyst was reduced by heating to 600° F. in H$_2$ flowing at 50 cm$^3$/min at atmospheric pressure and keeping it at that temperature for at least 1 hr. The reactor was cooled to the 518° F. temperature and pressurized to 1200 psig with hydrogen; the reactant n-hexadecane was then pumped through the reactor.

Yield periods were carried out after allowing steady state to be approached at a particular set of conditions (temperature, pressure, weight hourly space velocity [WHSV]). The conversion was varied by changing WHSV.

The yield of iso- and normal C$_4$-C$_{13}$ paraffin products, as functions of conversion at 1200 psig and 518° F., are shown FIGS. 1a to 1e.

As shown in FIGS. 1a to 1e, conversions below 60% iso and normal cracking products are formed in similar yields. At higher conversion, the yields of isoparaffin cracking products predominate. Yields at 50% n-hexadecane conversion are given in Table A; the yield ratios of normal- to iso-paraffin cracking products by carbon number are generally below 1. Such a catalyst would not be suitable for selectively producing light n-paraffins.

TABLE A

| Fractional Molar Yields at 50% n-Hexadecane conversion with Pt/USY, SAR = 60 (1200 psig, 518° F.) | | | |
|---|---|---|---|
| | Molar Yield | | |
| Carbon Number | n-paraffin ($\times 10^3$) | i-paraffin ($\times 10^3$) | Ratio n/i |
| 4 | 2.98 | 1.92 | 1.56 |
| 5 | 3.13 | 3.17 | 0.99 |
| 6 | 3.22 | 3.52 | 0.91 |
| 7 | 3.24 | 4.16 | 0.78 |
| 8 | 2.99 | 4.34 | 0.69 |
| 9 | 2.67 | 4.28 | 0.62 |
| 10 | 2.29 | 4.06 | 0.56 |
| 11 | 1.77 | 3.86 | 0.46 |
| 12 | 1.47 | 3.02 | 0.49 |
| 13 | 0.788 | 1.06 | 0.74 |

In general, with the catalyst of this example, yields of iso- and n-paraffin cracking products are similar at conversions below 60%, but isoparaffin yields predominate at higher conversions.

Example 3: Preparation of Pt/USY Zeolite with SAR=108

3 g of a high-silica FAU zeolite (Tosoh product 385 HUA, SAR=100 nominal) are placed into a vial with 18 cc of water and 15 g of 0.148M $NH_4OH$. Then 3 g of a platinum tetraamine dinitrate solution [prepared by dissolving 0.286 g of platinum tetramine dinitrate (Aesar, 49 wt % Pt) in 24.5 g of water and 4.1 g of a 0.148 M $NH_4OH$ solution] are added and the reaction mixture is left at room temperature for 3 days.

The solids then are collected by filtration and washed with 50 cc of water in 3 portions. Upon drying in vacuo, the solids are transferred to an oven and dried for 2 hr at 90° C. The solids are then spread thinly on a Pyrex dish and calcined according to the program described in Example 1.

The catalyst was pressed into a pellet, which was crushed to give solids with a 20-40-mesh size upon sieving.

The properties of the high SAR Pt/USY catalyst are provided below:

Pt content, wt %: 0.472
Pt dispersion, strong, %: 70.2
Pt dispersion, total, %: 117.4
Al content, wt %: 0.739
Si content, wt %: 41.6
$SiO_2/Al_2O_3$ molar ratio (SAR): 108

Example 4: Selectivity Profiles Using Pt/USY (SAR=108), Preparation Described in Example 3

0.7 g of the catalyst whose preparation is described in Example 3 is diluted with inert alundum and charged to a reactor comprised of a 0.25" OD tube of 0.035" wall thickness placed in a furnace. The catalyst is dried and reduced as indicated in Example 1. Experiments are performed at 1200 psig with conversion varied by changing WHSV, but because this catalyst's lower activity, a higher temperature (626 vs. 518° F.) was needed to obtain a conversion range similar to that shown for Example 2.

The yield of iso- and normal C4-C13 paraffin products, as functions of conversion at 1200 psig and 626° F., are shown FIGS. 2a to 2e.

As shown in FIGS. 2a to 2e, n-paraffins are produced in significantly greater yields than corresponding isoparaffins at all conversions, in marked contrast to selectivities obtained with Pt/USY, SAR=60, illustrating the selective formation of n-paraffin cracking products. Yields at 50% n-hexadecane conversion are given in Table B; for a given carbon number, the n:i ratio is greater than 1. The advantages of Pt/USY, SAR=108 for selectively producing n-paraffins are thus indicated.

TABLE B

Fractional Molar Yields at 51% n-Hexadecane conversion with Pt/USY, SAR = 105 (1200 psig, 626° F.)

| Carbon Number | Molar Yield | | |
| | n-paraffin ($\times 10^2$) | i-paraffin ($\times 10^3$) | Ratio n/i |
| --- | --- | --- | --- |
| 4 | 3.66 | 4.31 | 8.49 |
| 5 | 3.74 | 5.06 | 7.39 |
| 6 | 3.65 | 5.67 | 6.44 |
| 7 | 3.52 | 6.72 | 5.24 |

TABLE B-continued

Fractional Molar Yields at 51% n-Hexadecane conversion with Pt/USY, SAR = 105 (1200 psig, 626° F.)

| Carbon Number | Molar Yield | | |
| | n-paraffin ($\times 10^2$) | i-paraffin ($\times 10^3$) | Ratio n/i |
| --- | --- | --- | --- |
| 8 | 3.33 | 7.29 | 4.58 |
| 9 | 3.04 | 8.03 | 3.78 |
| 10 | 2.78 | 9.26 | 3.00 |
| 11 | 2.46 | 10.2 | 2.41 |
| 12 | 2.06 | 9.88 | 2.09 |
| 13 | 1.53 | 7.77 | 1.97 |

In general, with the catalyst of this example, i.e., a catalyst comprising Pt on a low-acidity (i.e., high SAR) USY zeolite, n-paraffin cracking products predominate, and the selective production of the latter is important to note.

Figure 3A:
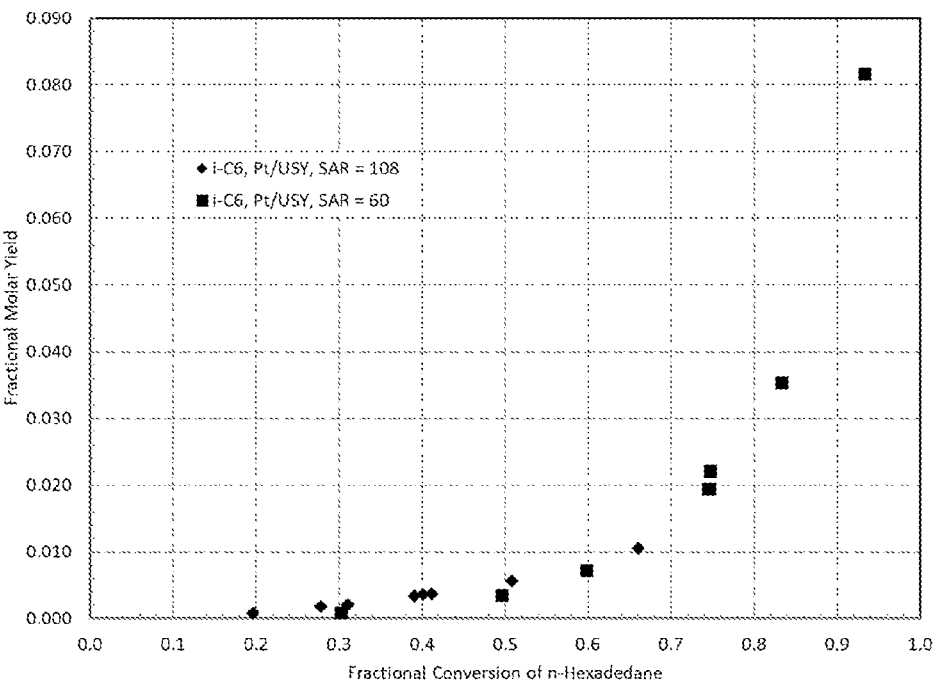
FIGS. 3a, 3b, and 3c show a comparison of selectivities to normal and branched paraffin cracking products between Pt/USY, SAR=60 and Pt/USY, SAR=108 for $C_6$, $C_8$, and $C_{10}$ products, as described in the examples.
Figure 3A:
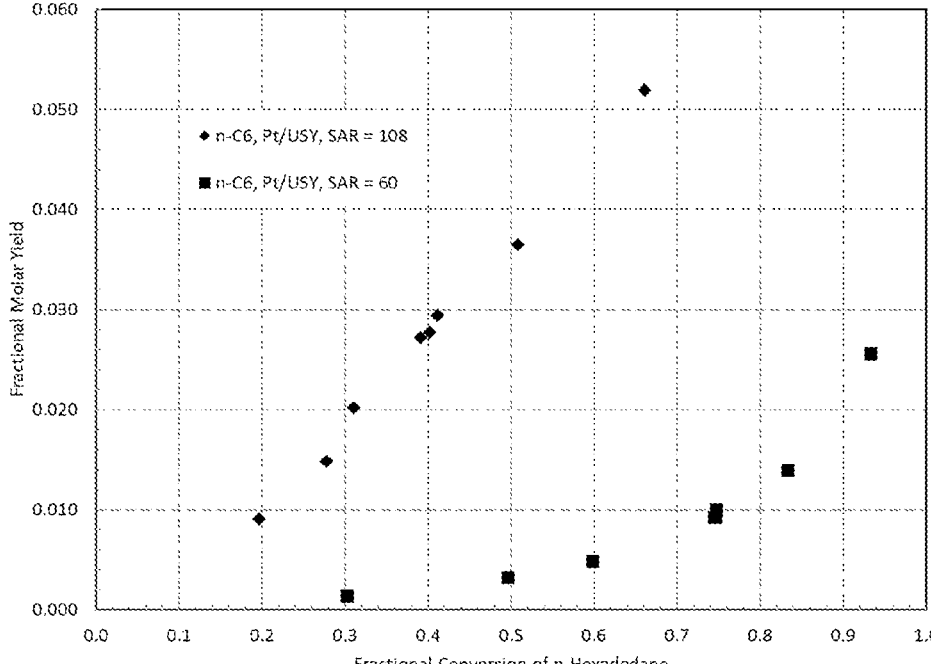
Figure 3B:
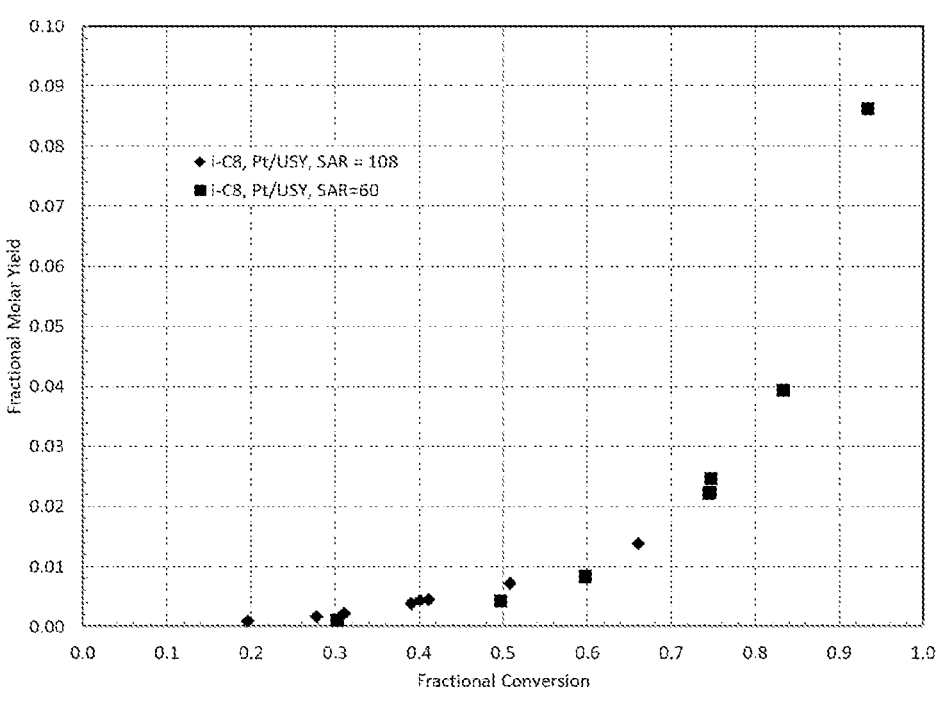
Figure 3B:
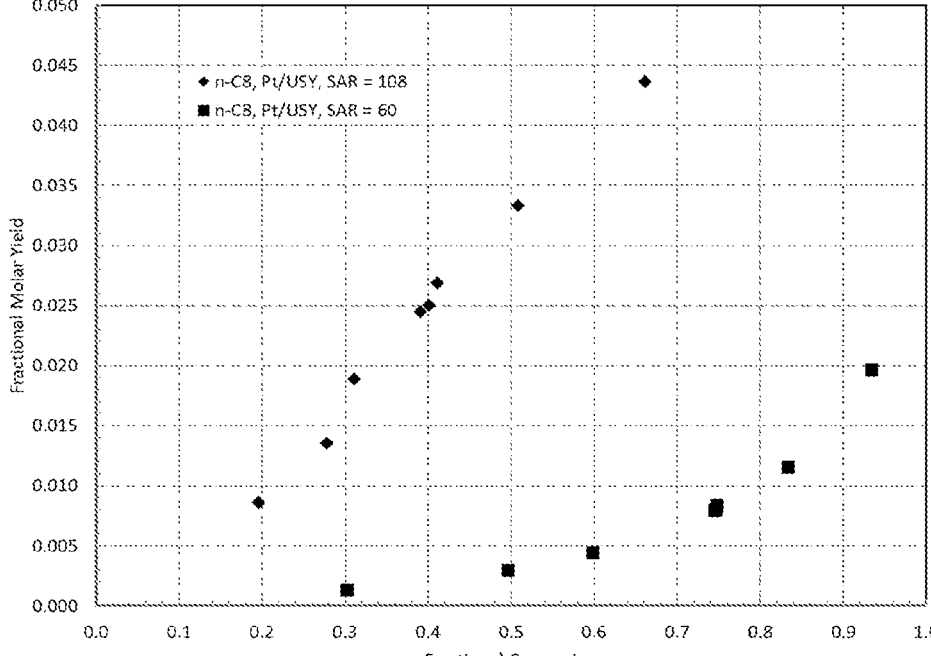
Figure 3C:
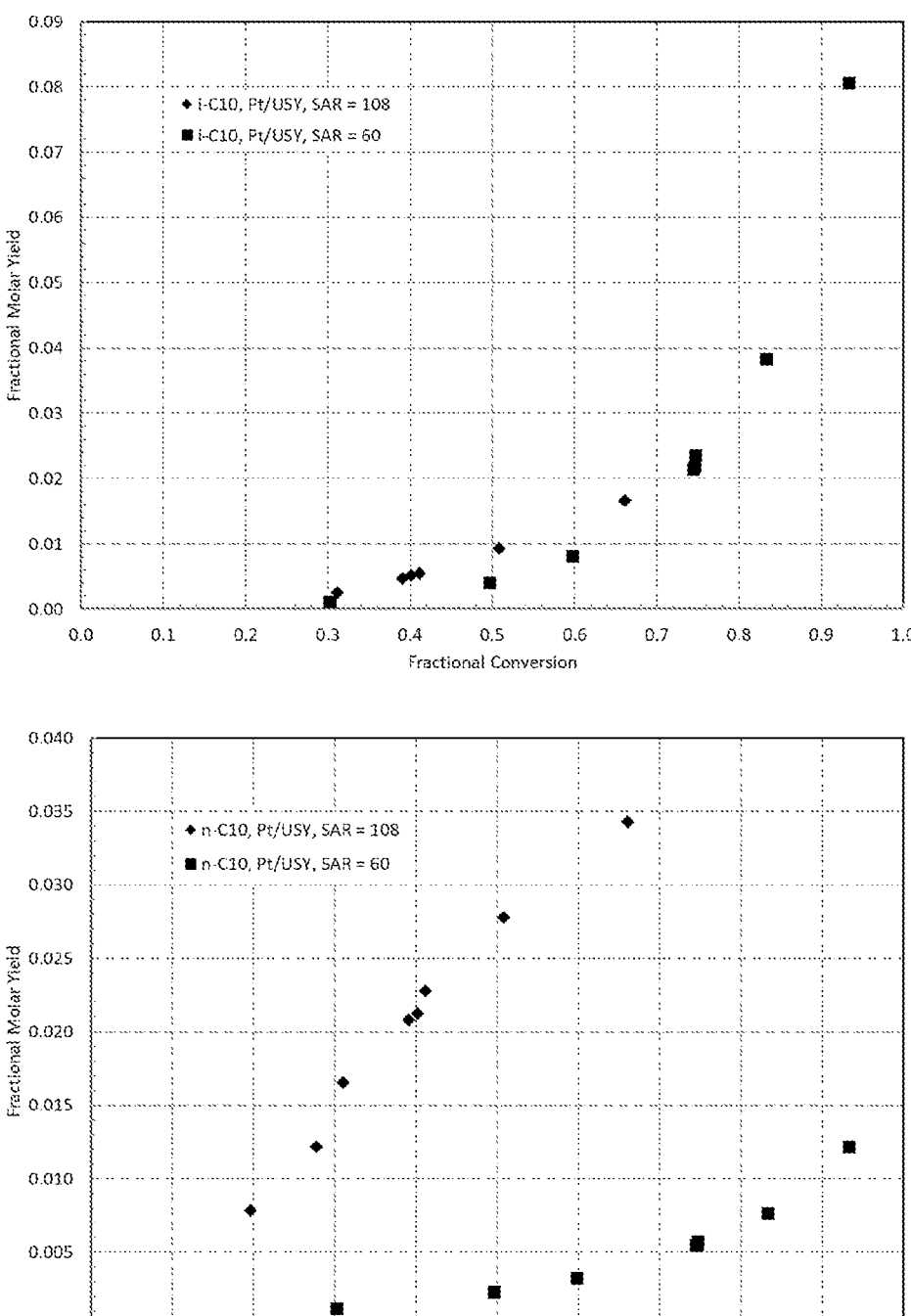

The selectivities to normal and branched cracking products can also be compared between the two catalysts by plotting the respective isomer yields of normal and branched cracking products from each catalyst on the same graph for a given carbon number. Representative results, shown in FIGS. 3a to 3c for $C_6$, $C_8$, and $C_{10}$ species, indicate the yields of normal paraffin cracking products are much greater with Pt/USY, SAR=108 at a given conversion (indicating greater selectivity) but that the yields and selectivities of branched paraffin cracking products are similar for the two catalysts.

Example 5: Preparation of Pt/SiO₂ Catalyst

To 1.22 g of Cabosil M5 fumed silica (impurities<5 ppm) are added 1.22 g of a platinum tetraamine dinitrate solution; the latter solution is prepared by adding 0.286 grams of platinum tetramine dinitrate (Aesar; 49 wt % Pt) to in 24.5 grams of water and 4.1 grams of a 0.148 M $NH_4OH$ solution. An additional 4.2 grams of water was added but in increments with gentle mixing, to achieve incipient wetness.

The catalyst was prepared on a thin Pyrex plate so that it could then be directly dried and calcined as has been described for the other 2 catalysts (see Examples 1 and 3).

The properties of the Pt/SiO₂ catalyst are provided below:

Pt content, wt %: 0.480

Pt dispersion, strong, %: 37.2

Pt dispersion, total, %: 62.3

Example 6: n-Hexadecane Reactivity in the Presence of the Catalyst Prepared in Example 5

0.7 g of the catalyst whose preparation is described in Example 5 was diluted with inert alundum and charged to a reactor comprised of a 0.25"-OD tube of 0.035" wall thickness placed in a furnace. The catalyst is dried and reduced as indicated in Example 3.

Experiments were carried out at 1200 psig, WHSV=0.97, and two temperatures: 518 and 536° F. In all cases, n-hexadecane conversion was below 2%, indicating that Pt/SiO₂ catalyst is less active than the catalyst described in Examples 3 and 4.

In a subsequent experiment, tetralin is fed to the reactor at 1200 psig, 518° F., and WHSV=10 (i.e., much milder conditions than those used for the experiments with n-hexadecane), complete hydrogenation of give cis- and trans-decalin occurs, indicating the high hydrogenation activity of the $Pt/SiO_2$ catalyst.

From this example, it is seen that $Pt/SiO_2$ has very low activity for n-hexadecane conversion at conditions comparable to those used in Example 2 and 4. Therefore, selective n-paraffin cracking products formation requires platinum loaded on a low-acidity (high SAR) zeolite. Despite its high hydrogenation activity, the $Pt/SiO_2$ does not catalyze selective n-paraffin production, indicating that a catalyst comprising platinum loaded on a low-acidity zeolite is needed to catalyze the selective production of n-paraffin cracking products.

Example 7: Preparation of Pt/ZSM-12 Catalyst

A 2-gram sample of ZE0217, a ZSM-12 structure available from Zeolyst, was calcined to remove the organic template, and then loaded into a vial with 12 grams of water and 20 grams of 0.148 M NH4OH solution. Platinum tetraamine dinitrate solution (2 grams) was added to the vial. The platinum tetraamine dinitrate solution was prepared from dissolving 0.286 grams of platinum tetraamine dinitrate (Aesar; 49 wt % Pt), in 24.5 grams of water and 4.1 grams of a 0.148 M NH4OH solution to provide buffering. 1 gram of this solution provided a catalyst with 0.5 wt % loading if all the Pt ends up on the zeolite.

The contents were let to sit at room temperature for 2 days. Then the solids were collected by filtration and washed with 50 cc of water in 3 portions. Upon drying in vacuo, the solids were then transferred to an oven at 90° C. and dried for 2 hours. Then the solids were spread thinly on a Pyrex dish and calcined according to the following program: in positive flow of air at 1° C./minute, raise the temperature to 120° C.; then hold for 2 hours at this temperature; and then again at the same rate, raise the temperature to 300° C. and hold for 3 hours.

The properties of the Pt/ZSM-12 catalyst are provided below:

Pt content, wt %: 0.447
Pt dispersion, strong, %: 29.5
Pt dispersion, total, %: 70.0
Al content, wt %: 0.701
Si content, wt %: 44.8
$SiO_2/Al_2O_3$ molar ratio (SAR): 115

Example 8: n-Hexadecane Reactivity in the Presence of the Catalyst Prepared in Example 7

0.7 g of the catalyst whose preparation is described in Example 7 was diluted with inert alundum and charged to a reactor comprised of a 0.25" OD tube of 0.035" wall thickness placed in a furnace. The catalyst was dried and reduced as indicated in Example 3.

Experiments were carried out at 1200 psig, WHSV=1.0, and at a temperature of 518° F. Conversion of n-hexadecane was 76%, which is significantly greater than the foregoing $Pt/SiO_2$ and Pt/USY catalysts. Pt/ZSM-12 catalyst is therefore much more active than the $Pt/SiO_2$ and Pt/USY catalysts and selective for n-paraffin cracking products.

From this example, it is seen that Pt/ZSM-12 has high activity for n-hexadecane conversion at conditions comparable to those used in Example 2 and 4. Selective n-paraffin cracking products formation is therefore seen to require platinum loaded on a low-acidity (high SAR) zeolite. As noted, despite its high hydrogenation activity, the $Pt/SiO_2$ catalyst does not catalyze selective n-paraffin production, indicating that a catalyst comprising platinum loaded on a low-acidity zeolite, such as a Pt/ZSM-12 catalyst, is needed to catalyze the selective production of n-paraffin cracking products.

For the avoidance of doubt, the present application is directed to the subject-matter described in the following numbered paragraphs:

1. A process for selectively producing hydrocracked n-paraffins from heavy n-paraffins comprising contacting a hydrocarbon feed comprising heavy n-paraffins with a hydrocracking catalyst comprising an unsulfided low acidity noble-metal containing zeolite under hydrocracking conditions to produce a hydrocarbon product comprising hydrocracked n-paraffins.

2. The process of paragraph 1, wherein the zeolite is an aluminosilicate.

3. The process of paragraph 1, wherein the zeolite is an aluminosilicate having a low alumina content and/or a high silica-to-alumina ratio.

4. The process in accordance with paragraphs 2 or 3, wherein the zeolite silica-to-alumina ratio is of a sufficient value or range to selectively produce n-paraffin cracking products, preferably n-paraffin products over isoparaffin products.

5. The process in accordance with paragraphs 2 or 3, wherein the zeolite silica-to-alumina ratio is at least about 70, or 80, or 90, or 100, or 110, or 120.

6. The process in accordance with paragraphs 1 to 5, wherein the zeolite is an aluminosilicate that does not contain boron or is not a borosilicate or aluminoborosilicate, or is other than a borosilicate or aluminoborosilicate.

7. The process in accordance with paragraphs 1 to 6, wherein the zeolite is an aluminosilicate zeolite hydrocracking catalyst selected from USY, Beta, ZSM-4, ZSM-12, ZSM-18, ZSM-20, Y, L or a combination thereof.

8. The process in accordance with paragraph 7, wherein the zeolite is selected from USY and ZSM-12, or a combination thereof.

9. The process in accordance with paragraphs 1 to 8, wherein the heavy n-paraffins comprise $C_{12+}$ n-paraffins, or are predominantly $C_{12+}$ n-paraffins, or wherein the $C_{12+}$ content is greater than about 50 wt %, or 60, or 70, or 80, or 90, or 95, or 98, or is about 100%.

10. The process in accordance with paragraphs 1 to 9, wherein the noble metal comprises platinum.

11. The process in accordance with paragraphs 1 to 10, wherein the hydrocracking conditions comprise a temperature of about 270° C. to about 330° C., a pressure in the range of about 200 psig to about 2000 psig and a space velocity in the range of about 0.4 to about 2.0 LHSV $hr^{-1}$.

12. The process in accordance with paragraphs 1 to 11, wherein the fractional yield of hydrocracked n-paraffin product is at least about 10 mol % greater than a corresponding fractional yield obtained using a hydrocracking catalyst that differs only in having a zeolite silica-to-alumina ratio that is no greater than about 60.

13. The process in accordance with paragraph 12, wherein the fractional yield of hydrocracked n-paraffin product is at least about 20, or 30, or 40, or 50, or 60, or 70, or 80, or 90, or 100 mol % greater.

14. Use of an unsulfided low acidity noble-metal containing zeolite for selectively producing hydrocracked n-paraffins from heavy n-paraffins in accordance with the process of paragraphs 1 to 13.

15. Use of an unsulfided low acidity noble-metal containing zeolite in accordance with paragraph 14, wherein the zeolite is an aluminosilicate zeolite hydrocracking catalyst selected from USY, Beta, ZSM-4, ZSM-12, ZSM-18, ZSM-20, Y, L or a combination thereof.

16. Use of an unsulfided low acidity noble-metal containing zeolite in accordance with paragraph 14, wherein the zeolite is an aluminosilicate zeolite hydrocracking catalyst selected from USY and ZSM-12, or a combination thereof.

17. A hydrocracked n-paraffin composition produced in accordance with the process of paragraphs 1 to 13.

Additional details concerning the scope of the invention and disclosure may be determined from the appended claims.

The foregoing description of one or more embodiments of the invention is primarily for illustrative purposes, it being recognized that variations might be used which would still incorporate the essence of the invention. Reference should be made to the following claims in determining the scope of the invention.

For the purposes of U.S. patent practice, and in other patent offices where permitted, all patents and publications cited in the foregoing description of the invention and any other part of the application are incorporated herein by reference to the extent that any information contained therein is consistent with and/or supplements the foregoing disclosure.

What is claimed is:

1. A process for selectively producing hydrocracked n-paraffins from heavy n-paraffins comprising contacting a hydrocarbon feed comprising heavy n-paraffins with a hydrocracking catalyst comprising an unsulfided low acidity platinum containing zeolite under hydrocracking conditions to produce a hydrocarbon product comprising hydrocracked n-paraffins, wherein the zeolite is a USY zeolite, ZSM-12, or a combination thereof;

wherein the zeolite silica-to-alumina ratio is at least about 70 and the zeolite silica-to-alumina ratio is of a sufficient value or range to selectively produce n-paraffin products over isoparaffin products; and wherein the fractional yield of hydrocracked n-paraffin product is at least about 10 mol % greater than a corresponding fractional yield obtained using a hydrocracking catalyst that differs only in having a zeolite silica-to-alumina ratio that is no greater than about 60.

2. The process of claim 1, wherein the zeolite silica-to-alumina ratio is at least about 80, or 90, or 100, or 110, or 120.

3. The process of claim 1, wherein the zeolite does not contain boron.

4. The process of claim 1, wherein the zeolite comprises USY and ZSM-12.

5. The process of claim 1, wherein the heavy n-paraffins comprise $C_{12+}$ n-paraffins, or are predominantly $C_{12+}$ n-paraffins, or wherein the $C_{12+}$ content is greater than about 50 wt %, or 60, or 70, or 80, or 90, or 95, or 98, or is about 100%.

6. The process of claim 1, wherein the hydrocracking conditions comprise a temperature of about 270° C. to about 330° C., a pressure in the range of about 200 psig to about 2000 psig and a space velocity in the range of about 0.4 to about 2.0 LHSV $hr^{-1}$.

7. The process of claim 1, wherein the molar yield ratio of hydrocracked n-paraffin product to i-paraffin product in the $C_4$ to $C_{13}$ range for n-hexadecane conversion varies from about 2 to about 8.5.

8. The process of claim 1, wherein the fractional yield of hydrocracked n-paraffin product is at least about 20, or 30, or 40, or 50, or 60, or 70, or 80, or 90, or 100 mol % greater.

* * * * *